June 7, 1938.  J. S. MILLER ET AL  2,119,824
APPARATUS AND PROCESS FOR USE IN DENTISTRY
Filed Aug. 17, 1935  2 Sheets-Sheet 1
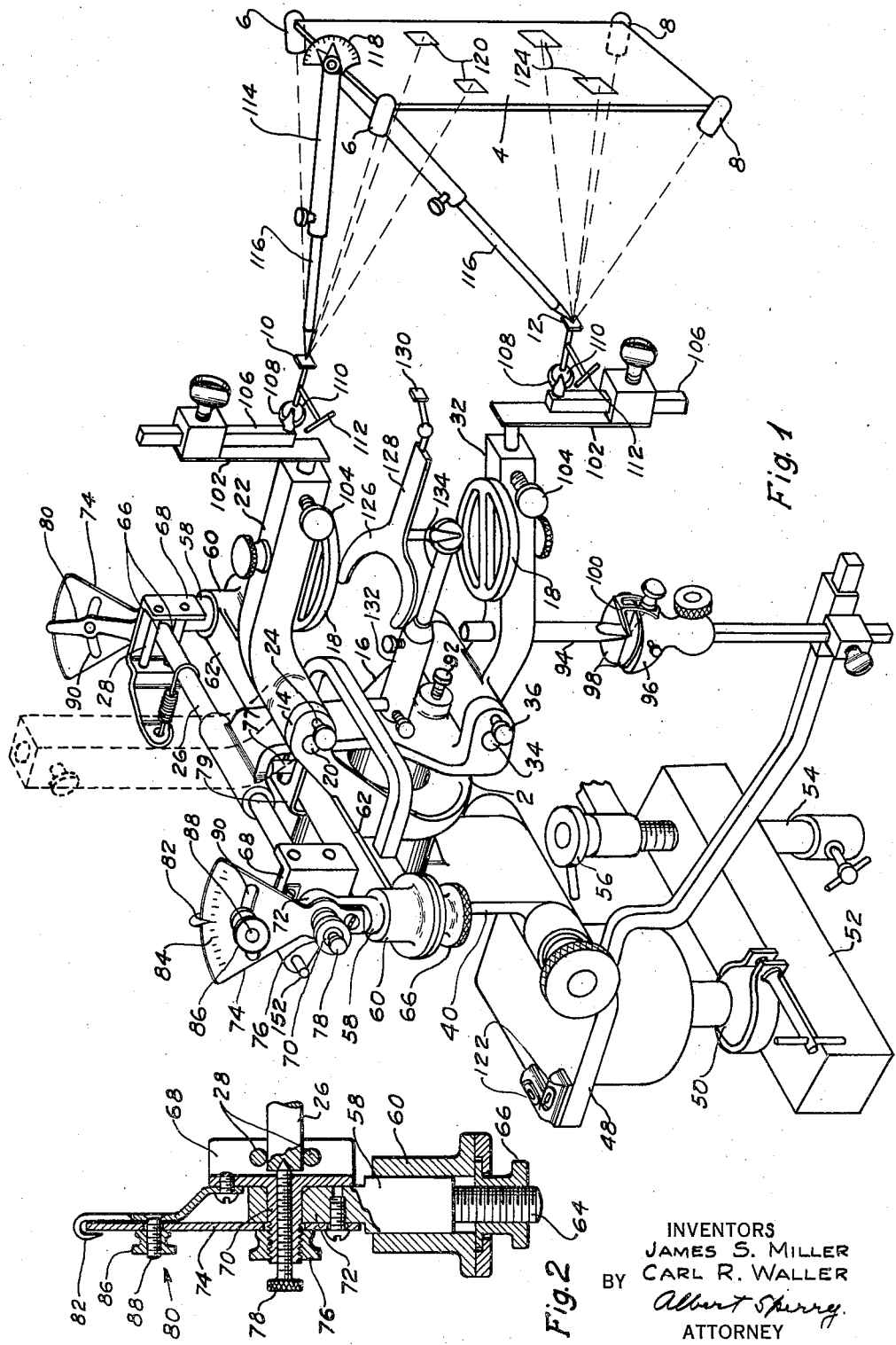
INVENTORS
JAMES S. MILLER
CARL R. WALLER
BY Albert Sperry
ATTORNEY June 7, 1938.  J. S. MILLER ET AL  2,119,824

APPARATUS AND PROCESS FOR USE IN DENTISTRY

Filed Aug. 17, 1935  2 Sheets-Sheet 2

INVENTORS
JAMES S. MILLER
CARL R. WALLER
BY Albert Sperry
ATTORNEY

Patented June 7, 1938

2,119,824

UNITED STATES PATENT OFFICE 2,119,824

APPARATUS AND PROCESS FOR USE IN DENTISTRY

James S. Miller and Carl Richard Waller, Trenton, N. J.; said Miller assignor to Helene Sylvia Miller, Trenton, N. J.

Application August 17, 1935, Serial No. 36,619

12 Claims. (Cl. 32—32)

Our invention relates to methods and means for use in dentistry and particularly to processes and apparatus adapted for use in reproducing or studying movements of a patient's jaw, movements of dentures or natural teeth within a person's mouth, for locating models of a patient's gums in an articulator and for various other purposes.

In our copending application Serial No. 713,790, filed March 3, 1934, we have described methods and apparatus for accurately determining and measuring the amount and character of movements of the lower jaw or mandible with respect to the upper jaw or maxilla, and for determining the relative locations of the jaws, for examining and measuring movement of natural teeth in their sockets and of artificial dentures within a patient's mouth.

The present invention is designed to utilize records so obtained or those obtained in other ways to reproduce the movements recorded. The methods and means employed for this purpose may embody either mechanical or optical elements or combinations of elements some of which are mechanical and others of which are optical, the particular form and arrangement of the elements in any case being chosen with due regard to the type of record used and the purpose for which the mechanism is employed. The reproducing mechanism may be designed to be used as an articulator for constructing dentures, as a test device for examining and correcting dentures, as an instrument for study and analysis of the movement recorded, for positioning models in an articulator or for any of a number of other purposes as desired.

The records or indications used may be in the form of marks, reflections or indications on a screen, photographs, scales or graduations for setting the recording device, surfaces or pointers having recorded positions or other suitable means of either a permanent or transient character adapted for indicating the positions or movements to be reproduced.

The mechanism employed will obviously be different in some respects when designed for use with records of different types and may be constructed in numerous forms to obtain the characteristic advantages of the invention.

One of the objects of the invention is to produce artificial dentures which accurately and faithfully correspond to a patient's natural teeth in all positions and movements thereof.

Another object of our invention is to accurately reproduce movements of a patient's jaw in a mechanical device.

A further object of our invention is to provide a novel form of reproducer having elements thereof adjustable to accurately reproduce the movements of a patient's jaw.

Another object of our invention is to reproduce jaw movements from records obtained without physical contact with the patient.

Another object of the invention is to utilize optical means in reproducing the movement of a patient's jaws.

A further object of our invention is to reproduce movements of a patient's jaw from records of a transient character.

These and other objects and features of the present invention will appear from the following description thereof in which reference is made to the accompanying figures of the drawings wherein typical forms of mechanism embodying our invention are shown for purposes of illustration.

In the drawings:

Fig. 1 is a perspective of a typical form of recording device embodying the present invention.

Figs. 2 and 3 are detail views of elements of the construction shown in Fig. 1,

Figure 3:
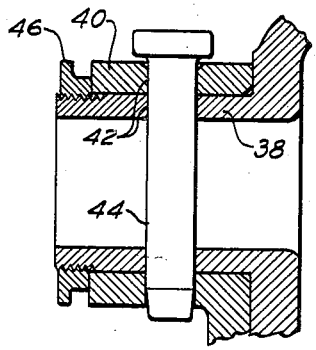

A typical construction embodying the present invention is shown in Figs. 1 to 3 of the drawings as designed for use as an articulator in which models are positioned and teeth are set up and ground. A construction of this character may be used in conjunction with either optical or mechanical means for reproducing recorded movements and with any suitable type of record. However when using either mechanical or optical means in reproducing the movements indicated by a record we may use any other suitable type of reproducer or articulator capable of being moved into positions or through paths corresponding to those indicated by the records.

When using an optical system in which mirrors, lights and a screen are employed as hereinafter described the mirrors may be located on any suitable part or element of the reproducer or articulator or on a member movable therewith and the lights and screen may be correspondingly positioned to give the desired indications for reproducing the movements recorded. Similarly when using a shadow for obtaining the desired indication the lights and screens may be located on opposite sides of a movable member on the reproducer or articulator or may be otherwise arranged so that a shadow falls upon the screen as illustrated for example in the construction of Fig. 6.

The arrangement as shown in Figs. 1 to 3 of the drawings is shown as used with an optical system in which the instrument has a head 2 and the optical elements include a screen 4, upper lights 6, lower lights 8 and mirrors 10 and 12. These elements are similar to those employed in obtaining the records of movements of the jaw or other movements in accordance with the invention described in our copending application referred to above although they may be of any other suitable type or construction adapted for use in reproducing movements from a record.

The screen 4 carries an inscribed or photographic record of the jaw movements and positions to be reproduced and the head 2 carries the members to be given the positions or movements corresponding to the records. These members as shown comprise a fixed upper member 14 which is normally stationary and corresponds to a person's upper jaw or maxilla and a lower movable member 16 which corresponds to a person's mandible. When the device is used as an articulator each of the members 14 and 16 is provided with a removable model retaining plate 18 detachably secured thereto as in the usual construction of articulators.

The member 14 herein referred to as "fixed" is in fact formed in two parts, one of which is pivotally secured to the other by a hinge 20 so that it may be raised to the position shown in dotted lines in Fig. 1 to provide convenient access to the lower member for positioning models thereon or for setting up teeth or performing other operations. Normally however the pivoted portion 22 of the fixed member is held in fixed position by means of a pin 24 passing through the member 14 and into the pivoted portion 22 adjacent the hinge to prevent movement thereof.

The movable member 16 is pivotally mounted on a shaft 26 the ends of which rest upon bearing surfaces 28 of artificial condyles 30 located on either side of the head 2. The member 16 like member 14 is formed in two parts with the portion 32 pivotally connected to the portion 16 by a hinge 34 and normally secured thereto for movement therewith by a pin 36 extending through the member 16 and into the member 32 adjacent the hinge 34.

With the parts in the positions shown in Fig. 1 the movable member 16 is located below the fixed member 14 just as the movable jaw or mandible of a person is located below the fixed jaw or maxilla. However for convenience in operation of the device, especially when it is employed as an articulator, it is frequently desirable to have the members 14 and 16 inverted so that the movable member is located above the fixed member. In order to obtain this positioning of the members the head 2 is provided with a tubular sleeve 38 shown in Fig. 3, extending from the rear face thereof and rotatable within a cylindrical bearing on support 40. The head and sleeve can therefore be rotated to reverse the positions of the members 14 and 16 at will and bring the movable member 16 into position above the fixed member 14.

The sleeve 38 and support 40 are formed with complementary openings 42 through which the removable pin 44 is passed to retain the head in either position and with either member above. A knurled lock nut 46 engages a thread on the end of sleeve 38 and abuts the support 40 to secure the head against movement after rotation thereof to either position and independently of the pin 44. Thus the device may be located in the position shown in Fig. 1 for reproducing the movements of the record and for setting the upper model in place or for setting the lower teeth and may be inverted to set the lower model in place and for setting up the upper teeth without disturbing the remaining elements of the construction or destroying adjustments thereof.

The support 40 by which the head 2 and the members 14 and 16 are carried is pivotally mounted on a base 48 supported by a ball and socket connection 50 on a suitable stand or column 52. As shown the column 52 itself may be raised or lowered by rotation of a screw 54 provided with a handle 56 so that the whole device may be raised or lowered and the head may be tilted or turned and moved toward or away from the screen 4 as desired to locate the device in any position convenient or necessary for reproducing the movements recorded.

The artificial condyles by which the shaft 26 carrying the lower member 16 is supported, are mounted on posts 58 which are movable within bearings 60 at the ends of arms 62 projecting from the head 2. The lower ends of the posts 58 are provided with threaded stems 64 having adjusting members 66 thereon the heads of which are knurled so that they may be readily turned to raise or lower either condyle independently of the other. In this way the varying characteristics in the positions of the condyles of different individuals may be readily and closely copied.

In order that the lower member may be given movements corresponding to those of the jaws of individuals having different condyle inclinations the bearing surfaces 28 of artificial condyles 30 are formed as bars carried by rotatable members 68 having portions 70 extending through bearings 72 in the upper ends of the posts 58. The ends of the portions 70 extend beyond the posts and through a plate 74 secured thereto and are threaded to receive a thumb nut 76 which engages plate 74 to retain the members 68 in adjusted position. Screws 78 extend through the thumbnuts 76 and are formed with pointed ends for engaging the ends of the shaft 26 to secure the shaft in its rearward position corresponding to the normal rest position of the mandible in which the condyles are both at the rear of the glenoid fossa. Longitudinal movement of the shaft 26, transversely of bearings 28, is prevented by a pin 77 on the shaft 26 extending into a slot formed in a member 79 secured to the fixed member 14. The shaft may therefore rotate upon bearings 28 and slide lengthwise thereof but cannot move transversely of the bearings.

Movement of the members 68 and bearing surfaces 28 about the bearings 72 serves to change the inclination of the bearing surfaces of each condyle independently of the other so that the ends of the shaft 26 may be made to move in any desired path corresponding to any condyle inclination of a person. Movement of the condyles is effected by handles 80 secured to the members 68 and formed at their ends with pointers 82 movable along the graduations 84 of the plate 74. The handle itself is formed as a thumb nut 86 threaded onto a bolt 88 extending through the arcuate slot 90 in plate 74. The handles 80 may therefore be secured against displacement by tightening the thumb nut 86 so that it engages plate 74 and prevents movement thereof. However the same result is obtained by tightening the thumb nut 76 so that either one may be used or one of the thumb nuts omitted if desired.

With the construction described above the lower member 16 may be given movements which are substantially identical to the movements of a person's jaw provided the characteristics of such movements are definitely known and followed. The rest position of the jaws can be reproduced by adjustment of screw 92 carried by the member 16 and engaging the front of head 2. The free end of the movable member is also provided with an adjustable pin 94 for engaging an incisor guide 96 positioned below the same and formed with adjustable side members 98 such as are commonly used in constructions of incisor guides for guiding the lower member 16 in its movements to right or left lateral positions. The present construction however embodies an additional element for use in reproducing movements on protrusion of the mandible without disturbing the adjustments of the side members 98. The element shown for this purpose is in the form of an inclined track 100 adjustably secured to the guide and sloping rearwardly to meet the central portion of the guide surface adjacent the point engaged by pin 94 when the lower member is in the position of occlusion and with both ends of shaft 26 at the rear of the bearing surfaces 28 of the artificial condyles. The track 100 may be raised or lowered to positions above or below the base of the guide so that tilting of the incisor guide for reproducing the protrusion positions is not necessary and previous adjustments of the guide and side members 98 need not be disturbed. With this construction movements corresponding to large "over bites" can be accurately reproduced while the incisor guide remains in position to reproduce other movements of the jaw.

The form of reproducer construction described may be used to reproduce the desired movements of a person's jaw when either optical or mechanical means are employed for determining the adjustments necessary to cause the members to assume or be moved to the proper positions or in the proper paths as indicated by a record. When using optical means for adjusting the artificial condyles and other elements of the construction to cause the movable member to move in accordance with a record we may use a mirror, a shadow or a spot of light as desired. In the construction of Fig. 1 mirrors 10 and 12 are employed and are mounted on the fixed member 14 and movable member 16 respectively. These mirrors are adjustable to assume positions corresponding to the positions which were assumed by the mirrors used in producing a record in accordance with the invention of our copending application referred to above. The adjustments may be effected in any suitable way as by the use of a laterally extending arm 102 movable toward and away from the screen and secured in place by thumb nut 104. The end of arm 102 is formed to receive a slidable member 106 terminating in a spring claw 108 retaining a ball 110 by which the mirror is carried. A handle 112 extends from a projection on ball 110 to permit the position of the mirror to be easily and quickly altered until it corresponds to the position of the mirror used in making the record. The supports for mirrors 10 and 12 may be the same or varied to adapt the same for adjustment but are preferably movable in all directions with respect to the member by which it is carried and with respect to the screen upon which the record is located.

An optically produced record of the type hereinafter referred to may be produced as described in our copending application by placing mirrors in fixed positions with respect to a person's upper jaw or maxilla and their lower jaw or mandible. Light from a suitable source is reflected from each mirror onto a screen and the areas in which the reflections fall on the screen are recorded with the lower jaw in the position of occlusion right and left lateral occlusion and protrusion or in other positions as desired.

In using the reproducer illustrated with a record of the movements to be reproduced which has been made as described above the record is placed on the screen 4 in the same position with respect to the lights 6 and 8 that it was when the record was made. The reproducer is moved into the position which was occupied by the patient's head in producing the record and the position of the mirrors 10 and 12 roughly established by a device such as the forked member 114 mounted on or adjacent the screen and provided with movable and extensible arms 116 and a graduated plate 118 for indicating the positions in which the mirrors were located in making the record.

Thereafter the mirror 10 on the fixed member 14 is moved and if necessary the head 2 adjusted on base 48 and column 52 until reflections of light from the sources 6 fall upon the indicated areas 120 on the screen. For convenience the base 48 is preferably placed in a level position as indicated by the spirit levels 122 and the head 2 moved to give the necessary angular positions. However this is not essential since the movements may be reproduced with the base in other positions. When the reflections are accurately positioned in the areas 120 the mirror 10 will necessarily be in exactly the same position as was the mirror used in producing the record, provided of course, the screen and lights are in the positions used in recording. Having established the position for mirror 10 and member 14 the parts are secured in place since they are not to be moved during the reproducing operation.

The shaft 26 by which the lower member is supported is then secured in position at the rear of the artificial condyles by screws 78 engaging the ends thereof so that the lower member may be pivotally moved but will be in the rest position corresponding to the position of the patient's jaw when the condyles are at the rear of the glenoid fossa and the teeth slightly separated. The mirror 12 on the movable member 16 is then adjusted in its position until reflections of light from the sources 8 fall upon the areas 124 of the record corresponding to the rest position of the patient's jaw. The rest position for the articulator members is thus established and corresponds accurately to the rest position of the patients. The screw 92 is adjusted to engage the face of the head 2 and the rest position is reproduced.

The dentist then adjusts the condyles of the reproducer as necessary to cause the lower member to move to the position of occlusion which is indicated by movement of the reflections from mirror 12 on the screen into the areas indicated on the record as the patient's occlusion position. For this purpose he raises or lowers either condyle 30 until pivotal movement of the member 16 with the shaft 26 still in its rearward position causes reflections from the mirror 12 to fall upon the recorded areas.

With the member 16 in the occlusion position the pin 94 and incisor guide 96 are adjusted so that the pin 94 rests on the upper surface of the guide between the side members 98. Lateral movements of the movable member 16 are now made after retracting screws 78 from the ends of the shaft 26, and adjustments of the angular position of the artificial condyles are made to enable reflections from the mirror 12 to fall into the recorded areas on screen 4 corresponding to right and left lateral occlusion. Tilting of the condyles is effected by loosening thumb nuts 76 and 86 and moving the handle 80 to the proper position. This is readily determined by observing movement of the light on the screen and when attained either or both of the thumb nuts is tightened to retain the condyle in the proper inclination. Movement of the side members 98 of the incisor guide usually have to be made in conjunction with the movements of the artificial condyles but when established as determined by the reflections on the screen they need not again be changed.

In a similar way adjustment of the other artificial condyle and the opposite side member of the incisor guide are made so that both right and left lateral occlusion are established.

The position for protrusion of the jaw can then be readily obtained since the condyle inclinations are not changed and the only adjustment necessary is in raising or lowering the element 100 on the incisor guide to cause the reflections on the screen 4 to fall in the areas determined upon movement of the patient's jaw to the position of protrusion.

The adjustments thus obtained insure movement of the member 16 of the reproducer or articulator into the same positions and through the same paths as the patient's jaw and render it possible to study and analyze the movements, set up and grind teeth in artificial dentures and determine the character of errors in existing dentures so as to correct the same.

In setting up the teeth of an artificial denture it is important that models of the surfaces against which the dentures are to bear shall be positioned in the articulator or reproducer in the same positions with respect to the fixed and movable members thereof as are the surfaces themselves with respect to the patient's jaws. In order to place the models in the articulator with the same accuracy as the movements are reproduced we use a fork 126 having an extension 128 to which a mirror 130 is adjustably secured. This fork is secured to a bite or impression of the surfaces to be engaged by the denture and a record of the position thereof with reference to a mirror on the person's head or lower jaw is made on the screen as more fully described in our copending application.

The fork with the impression or bite in place thereon is then placed in a holder 132 removably mounted on the head 2 between the upper and lower member and is pivotally secured to an adjustable extension 134 thereof by means of a ball and socket connection 136. The fork and the impression or bite are moved, tilted or adjusted in position while the mirror remains in fixed position thereon until the reflections of light from mirror 130 fall in the recorded areas on screen 4. The fork is then secured in place without disturbing the mirror. Pin 24 which holds the pivoted portion 22 of the fixed member in place is now removed and the portion raised so that the model can be placed in the impression on the fork. The model is positioned, portion 22 lowered and pin 24 again inserted and plaster or other means poured about the securing plate 18 and into contact with the model. The model is thus accurately positioned and secured to the fixed member. The pin 44 which holds head 2 in place is then removed, the lock nut 46 loosened and the head inverted. When using two separate impressions of the gums instead of the usual bite the other model is then positioned in the articulator and secured in place in the same manner as the first model, using a second fork, impression and mirror. The fork holder is then removed from the articulator and the dentist is ready to set up the teeth. The same procedure may of course be used when a "bite" is employed to position the bite and both models in the articulator only one fork and one operation with the optical system being needed.

In setting up the teeth they are located and ground in the usual manner to enable the movable member of the articulator to be moved to cause the reflections from mirror 12 to fall in the recorded areas on the screen. The dentist is then sure of accurately positioning and grinding the teeth so as to produce accurate dentures which enable the patient to articulate in a natural and normal manner without interference and discomfort.

Figure 4:
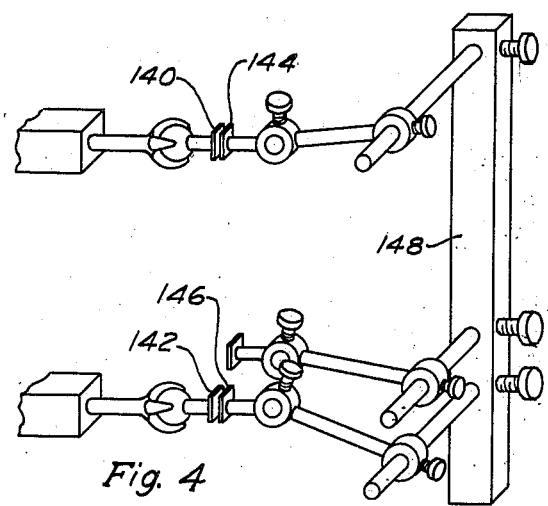
Fig. 4 is a diagrammatic illustration of mechanical means for use in reproducing positions and movements of a patient's jaw.

The invention as described above utilizes optical means for reproducing the desired movements and for positioning the models. The records employed for this purpose are obtained optically as described in our copending application. However, the same results may be obtained when using mechanical recording means for reproducing the movements and positions of a person's jaws. As illustrated in Fig. 4 of the drawings a mechanical recording device of the type described in our copending application may be used. The articulator or reproducer may be of any desired type such as that described above and is provided with plane surfaces 140 and 142 on the upper and lower members of the articulator respectively. These surfaces correspond in positions and function to the mirrors 10 and 12 employed in the optical system described above and are positioned adjacent to or in contact with complementary plane surfaces 144 and 146 on the recording member 148 to reproduce the positions of the members employed in making the record. Adjustments of the articulator are made just as when using the optical system and the movements of the movable member of the articulator are therefore caused to reproduce movements of a patient's jaw in a similar accurate manner.

Figure 5:
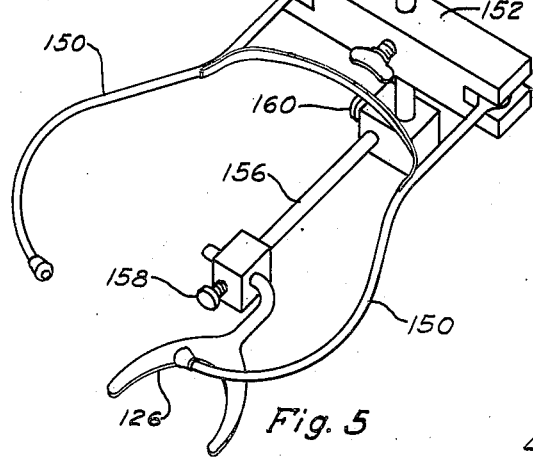
Fig. 5 is a perspective of a mechanical model positioning means adapted for use in the practice of our invention.

In transferring the models to the articulator with mechanical means we may employ a device as illustrated in Fig. 5 which is provided with yielding arms 150 adapted to rest lightly in the patient's ears. A frame 152 by which the arms are supported is provided with a spirit level 154 or similar leveling device and an adjustable support 156 extends downwardly therefrom to engage and hold a fork 126 by which a bite or impression is carried. The fork employed is similar to that used in the optical system but need have no mirror. The patient's head is moved or tilted until the frame is level and the fork is then secured in position by tightening thumb nuts 158 and 160. The device after being removed from the patient is applied to the articulator by placing the spring arms 150 in engagement with projections 152 on the rear of the artificial condyles of the articulator. The frame is again located in a level position by the dentist while the fork and impression are located between the upper and lower members of the articulator. The models are then placed in position on the impression and secured to the plates 18 on the upper and lower members of the articulator as when using the optical system. In this way the position and location of the models may be accurately established to insure the production of correct and naturally functioning dentures.

The device described may be used for positioning the models in any type of articulator independently of whether the reproducing system here described is employed or not and has been used to advantage when employing an optical system for reproducing the jaw movements. Similarly the models may be positioned in the articulator by optical means when using a mechanical device for reproducing the jaw movements. It will also be understood that certain of the positions of either the lower or upper member of the reproducer may be established by optical means while using mechanical means for establishing or reproducing other positions or movements of a record. Furthermore when using an optical system we may employ a shadow in much the same manner as the mirrors and reflections are used in the construction illustrated in Fig. 1.

Figure 6:
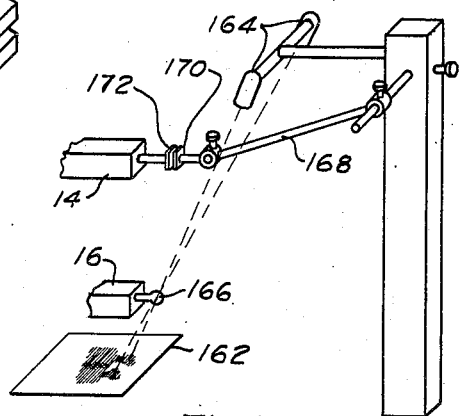
Fig. 6 is a perspective of the pertinent elements of an alternative form of optical reproducer embodying the present invention.

In Fig. 6 of the drawings a shadow is employed for reproducing the movements and positions of the jaw. In this arrangement we use a screen 162 having a record thereon of movements and positions of a patient's jaw produced by means of shadows. Lights 164 are positioned in the same location with respect to the screen as were the lights used in making the record. A member 166 corresponding to that movable with the patient's lower jaw during the recording operation is similarly positioned with respect to the movable member 16 of the reproducer. The position of the upper member is thereafter established to correspond to the position of the patient's head at the time of making the record by a mechanical device 168 in the form of an adjustable arm having a plane surface 170 thereon engaging or positioned parallel to and adjacent a member 172 on the fixed member 14 having a complementary plane surface thereon.

Movements of the patient's jaw are reproduced by causing the shadows of the member 166 to fall on corresponding areas on the screen 162 below the reproducer indicating that the movable member of the reproducer has been moved to the positions to which the patient's jaw was moved in making the record. The jaw movements and positions are thus accurately recorded and the construction of accurate, properly functioning dentures made possible.

Figure 7:
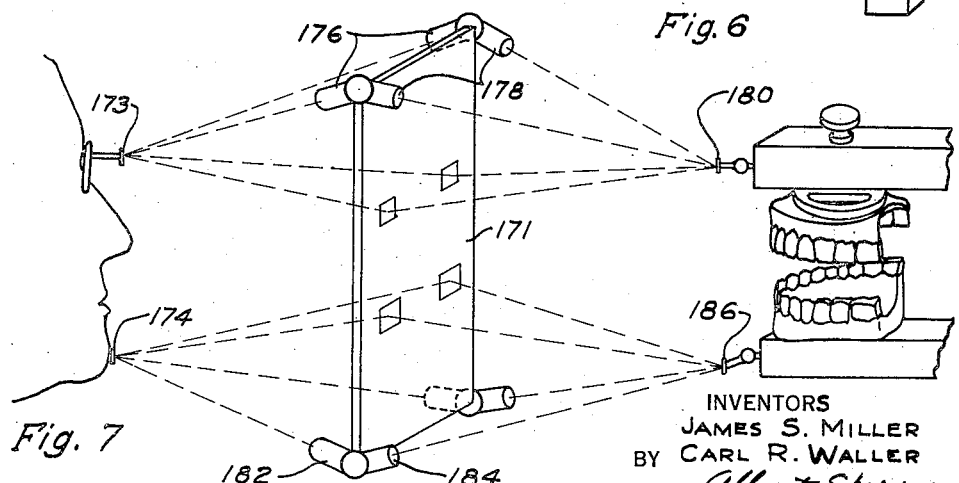
Fig. 7 is a diagrammatic illustration of a further alternative form of mechanism embodying our invention.

In Fig. 7 of the drawings we have illustrated a typical system wherein the movements of a patient's jaw are reproduced when employing a record of a transient character. With this construction the patient is located on one side of a vertical ground glass screen 171 and the reproducer or articulator is located on the other. Mirrors 173 and 174 are located on the redex nasi of the patient or on a pair of dark glasses worn by the patient and on the patient's mentum on the lower jaw or on a member secured to the patient's teeth or denture. Light from lamps 176 and 178 is passed at the same angle with respect to the screen 171 onto the mirror 173 and a mirror 180 on the fixed member of the reproducer. In a similar way light is passed from lamps 182 and 184 onto mirror 174 and a corresponding mirror 186 on the movable member of the articulator.

The positions of reflections from mirrors 173 and 174 on the screen 171 accurately establish the positions of the patient's head and lower jaw with respect to the screen. The positions of the upper and lower members of the reproducer may be similarly accurately located by movement and adjustment of the reproducer and the mirrors 180 and 186 on the fixed and movable members to cause the reflections therefrom to coincide with the reflection from the mirrors on the patient. Thereafter movements of the patient's jaw cause the reflection from mirror 174 to move to different positions on the screen and these movements may be followed and reproduced by movements of the movable member of the reproducer. Adjustment of the reproducer to enable the reflection therefrom to follow the reflection from mirror 174 insures accurate movement of the movable member of the reproducer. The patient can than be dismissed and the reproducer used for studying and analyzing the patient's jaw movements and positions, for producing dentures and for other purposes.

From the foregoing description of various forms of our invention it will be evident that the principles thereof may be embodied in various forms of mechanism and may be used in different ways to produce artificial dentures which correspond faithfully to the patient's natural teeth and which permit normal and natural articulation to be enjoyed. In view thereof it should be understood that we do not intend that our invention shall be limited to the typical forms and practices thereof herein described since the foregoing embodiments of our invention are intended to be illustrative only and are not intended to limit the scope of our invention.

We claim:—

1. Apparatus for use in dentistry having in combination a record of the relative positions of a person's head and lower jaw, a reproducer having a fixed member and a movable member, an optical indicating element on said fixed member, a support for said reproducer movable to locate said element in the position indicated by said record as the position of the patient's head, an optical indicating element on said movable member and a support for said movable member adjustable to permit movement of the indicating element thereon to the position indicated by said record as the position of said lower jaw and a source of light cooperating with said optical indicating elements to produce an indication on said record of the positions of the fixed and movable members of said reproducer.

2. Apparatus for use in reproducing movements of a person's jaw having in combination a reproducer and an optical system including a source of light, a record of the movements to be reproduced and an element on the reproducer interposed between the light and the record, said element being movable to cause light from said source to fall in predetermined areas of said record.

3. Apparatus for use in dentistry having in combination a record of the relative positions of a patient's head and lower jaw, a reproducer having a fixed member and a movable member and an optical system including a source of light and an element movable with said movable member interposed between said light and record, to cause light from said source to fall in predetermined areas of said record on movement of the movable member of said reproducer.

4. Apparatus for use in dentistry having in combination a record of the relative positions of a patient's head and lower jaw, a reproducer having a fixed member and a movable member, means on the fixed member movable to a predetermined position with respect to said record and an optical system including a light and an element movable with said movable member and interposed between said light and record, to cause said light from said source to fall in predetermined areas of said record on movement of the movable member of said reproducer.

5. The combination with a dental reproducer having a fixed member and a movable member of an optical system including a source of light, a screen and a mirror and a support for said mirror carried by one of said members and adjustable to locate said mirror in a position to cause light from said source which falls on said mirror to be reflected onto said screen.

6. Apparatus for use in dentistry comprising a reproducer, a source of light and a screen, means for projecting light from said source onto said screen, indicating means on said reproducer located between said source of light and said screen and a support for the reproducer adjustable to change the position of the reproducer and said indicating means with respect to said screen, to cause light from said source to fall in predetermined areas on said screen.

7. Apparatus for use in dentistry comprising a reproducer, a source of light and a screen, means for projecting light from said source onto said screen, indicating means on said reproducer located between said source of light and said screen and adjusting mechanism for altering the position of said indicating means with respect to said screen, to cause light from said source to fall in predetermined areas on said screen.

8. A dental reproducer having relatively movable jaws in combination with an optical system having a source of light, a screen and means movable with one of the jaws of the reproducer, said means being so positioned with respect to said light and screen that light from said source falls first on said means and thereafter falls on said screen.

9. Apparatus for locating models in an articulator comprising members adapted to be located in fixed positions with respect to base plates having impressions formed therein and an optical system including a screen and means for projecting light onto said members, said means and said screen being so positioned that light falls first on said members and thereafter falls on said screen.

10. A method of reproducing the location or movement of a person's upper and lower jaws comprising the steps of locating a person's head and a fixed member of a reproducer in predetermined positions with respect to a screen and simultaneously projecting light from a predetermined point on the person's lower jaw and from a movable member of the reproducer onto the same area on the screen.

11. In a dental reproducer having a movable member and incisor guide for controlling movement of said member, said guide presenting a surface having a central portion, two side portions movable to incline positions with respect to said central portion, and means located between said side portions and movable independently thereof into an incline position with respect to said central portion for guiding said movable member in reproducing protrusive movements.

12. The combination with a device for use in the production of artificial dentures of an optical system including a source of light, a screen and a mirror and a support for the mirror carried by said device and having universal movement with respect to said device to position said mirror to reflect light from said source onto said screen.

JAMES S. MILLER.
CARL RICHARD WALLER.